US008630292B2

(12) United States Patent
Danne et al.

(10) Patent No.: US 8,630,292 B2
(45) Date of Patent: Jan. 14, 2014

(54) METHOD AND SYSTEM FOR DISTRIBUTING A MULTI-SERVICE MESSAGE FROM A CLIENT TO MULTIPLE RELATED SERVICE APPLICATIONS

(75) Inventors: Anders Danne, Kista (SE); Anders Lindgren, Älvsjo (SE); Christer Boberg, Tungelsta (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1027 days.

(21) Appl. No.: 12/282,558

(22) PCT Filed: Mar. 12, 2007

(86) PCT No.: PCT/SE2007/000232
§ 371 (c)(1),
(2), (4) Date: Sep. 11, 2008

(87) PCT Pub. No.: WO2007/120092
PCT Pub. Date: Oct. 25, 2007

(65) Prior Publication Data
US 2009/0029726 A1    Jan. 29, 2009

(30) Foreign Application Priority Data
Mar. 13, 2006    (EP) ..................................... 06445009

(51) Int. Cl.
*H04L 12/28*    (2006.01)
*H04M 3/42*    (2006.01)
(52) U.S. Cl.
USPC .......................... 370/392; 370/393; 455/414.1
(58) Field of Classification Search
USPC .................. 455/414.1; 379/392, 393
See application file for complete search history.

(56) References Cited

U.S. PATENT DOCUMENTS

| 5,805,823 | A | 9/1998 | Seitz |
| 2003/0147411 | A1 | 8/2003 | Goosman |
| 2004/0203664 | A1* | 10/2004 | Lei et al. ..................... 455/414.1 |
| 2005/0021616 | A1* | 1/2005 | Rajahalme et al. ........... 709/204 |
| 2005/0237992 | A1* | 10/2005 | Mishra et al. ................ 370/349 |
| 2006/0029099 | A1* | 2/2006 | Jang et al. ..................... 370/473 |
| 2006/0252444 | A1* | 11/2006 | Ozugur ......................... 455/519 |
| 2007/0014245 | A1* | 1/2007 | Aloni et al. ................... 370/252 |

FOREIGN PATENT DOCUMENTS

| WO | WO 2005088949 A1 | 9/2005 |
| WO | WO 2005/104442 A2 | 11/2005 |
| WO | WO 2005112294 A2 | 11/2005 |
| WO | WO 2007078159 A1 | 7/2007 |

OTHER PUBLICATIONS

Roach, A.B. Session Initiation Protocol (SIP)—Specific Event Notifications. Network Working Group; Request for Comments: 3265, Jun. 2002, retrieved from: http://www.ietf.org/rfc/rfc3265.txt.

* cited by examiner

*Primary Examiner* — Vladimir Magloire
*Assistant Examiner* — Edd Rianne Plata

(57) ABSTRACT

A method and arrangement for distributing services messages from a client terminal to multiple service units or applications in one or more application servers in a multimedia service network. A service message distributor receives from the terminal, a multi-service message that includes a plurality of service message documents containing service-related data targeted to a specific service unit or application. The message distributor converts the received message into a plurality of individual service messages corresponding to the documents. The individual messages are sent separately toward their respective target service units or applications.

27 Claims, 4 Drawing Sheets

METHOD AND SYSTEM FOR DISTRIBUTING A MULTI-SERVICE MESSAGE FROM A CLIENT TO MULTIPLE RELATED SERVICE APPLICATIONS

TECHNICAL FIELD

The present invention relates generally to a method and arrangement for handling service messages from a client connected to a telecommunication network. In particular, the invention is concerned with reducing the amount of signalling when service messages are sent from a client terminal to multiple service units or applications in one or more application servers.

BACKGROUND

With the emergence of 3G mobile telephony, new packet-based communication technologies have been developed for communicating multimedia content. For example, GPRS (General Packet Radio Service) and WCDMA (Wideband Code Division Multiple Access) technologies support wireless multimedia telephony services involving packet-switched communication of data representing images, text, documents, animations, audio files, video files, etc., in addition to traditional circuit-switched voice calls.

Recently, a network architecture called "IP Multimedia Subsystem" (IMS) has been developed by the 3$^{rd}$ Generation Partnership Project (3GPP) as an open standard, to provide multimedia services for mobile clients in the packet domain. IMS is generally a platform for enabling services based on IP transport, more or less independent of the access technology used and basically not restricted to any limited set of specific services.

A specification for session setup has been defined called "SIP" (Session Initiation Protocol, according to the standard IETF RFC 3261 et al), which is an application-layer control (signalling) protocol for creating, modifying and terminating sessions over a packet-switched logic. SIP is generally used by IMS networks for supporting multimedia services.

FIG. 1 illustrates schematically a basic network structure for providing multimedia services by means of an IMS service network. It should be noted that the figure is greatly simplified and only shows a selection of network nodes helpful to understand the context of the present invention. A mobile terminal A is connected to a first radio access network 100 and may communicate with another mobile terminal B connected to a second radio access network 102, in a packet-switched communication session S. Terminal A may also communicate with a fixed terminal or computer or a content server delivering some multimedia content to the terminal, such as a piece of music, a film or a game.

An IMS network 104 is connected to the first radio access network 100 and handles the session S and other multimedia services for terminal A. In fact, the IMS network 104 receives and processes any service requests or data from the user of terminal A. In this figure, a corresponding similar IMS network 106 handles the session S and other multimedia services for terminal B, and the two IMS networks 104 and 106 may be controlled by different operators. Terminals A and B may of course alternatively be connected to the same access network and/or belong to the same IMS network.

The illustrated session S is managed by a node called S-CSCF (Serving Call Session Control Function) 108 assigned to terminal A in the IMS network 104, and the used multimedia service is enabled and executed by an application server 110. Further, a main database element HSS (Home Subscriber Server) 112 stores subscriber and authentication data as well as service information, among other things, that the application server 110 and S-CSCF 108 can retrieve for executing services for clients.

IMS network 104 also contains the nodes I-CSCF (Interrogating Call Session Control Function) 114 receiving messages from other IMS networks such as network 106, and P-CSCF (Proxy Call Session Control Function) 116 acting as an entry point for clients connected to access network 100. Each application server supports one or more specific multimedia services and typically contains several "service units" or "applications" for different types of services.

Examples of services defined for IMS networks include "Instant Messaging" (IM) "Push-to-talk over Cellular" (PoC) and "Presence", all using SIP signalling for controlling sessions. Instant Messaging provides for transmission of relatively short messages between terminals involving different types of media. PoC enables a group of mobile users to communicate collectively by pushing a button or the like to open a channel in order to talk or send multimedia content. Presence services basically make data of a client available to other clients.

In multimedia services, the term "presence" generally represents a dynamic and variable state profile of a client, involving the publishing of presence data of a client, which can also be used to control other services. Presence data basically defines the "state" of a client and his/her equipment in any predefined respect. Thus, the term "presence" should be understood in a broad sense, and the following exemplary client states may make up the presence data:

- A personal status, e.g. available, busy, in a meeting, on holiday, etc.
- A terminal status, e.g. switched on/off, engaged, out of coverage, etc.
- The geographic location of the client/terminal.
- Terminal capabilities, e.g. functionality for SMS, MMS, chat, IM, video, etc.
- Terminal selections, e.g. call forwarding, language, etc.
- Other client information, e.g. interests, occupations, personal characteristics, moods, personal logos, logo depending on the current mood, etc.

This type of information is continually stored in application servers in the IMS network, if required, based on so-called "publications of events" received from clients or their access network, whenever any presence data or other data for a client is introduced, changed or deleted. According to some services, a client may thus also subscribe for selected presence data or other data of one or more other users, e.g. according to a list of users, which is also handled by an application server in the IMS network.

A SIP message called "SIP PUBLISH" is generally used by clients to send dynamic data (e.g. presence data) to application servers in the IMS network. Another SIP message called "SIP SUBSCRIBE" is used by clients to subscribe for such dynamic data of other clients, as handled by service units in application servers.

A "client state" represents the maintenance of client-related information in an application server during a limited time period as determined by a pre-set expiry time, sometimes referred to as TTL (Time To Live). Such client-related information may relate to published client data or a client's subscription for data of other users.

However, these services may result in a large amount of messages that are sent from clients towards the IMS network, in particular for Presence services. For example, a terminal may be obliged to send a series of SIP PUBLISH messages to different service units in application servers immediately after the terminal has been registered in the IMS network after being powered-on, in order to publish updated client data.

As the client state for published client data or a data subscription also has an expiry time period or TTL, the published data or data subscription becomes invalid as the time expires. The expiry time may be set by the client or the application server, typically one hour in the Presence case. In the current service implementation and according to the different standards of IETF, 3GPP and OMA, the data publication or subscription must be frequently refreshed in order to maintain the data/subscription valid in the application server, even if the data/subscription is not changed during this period. A refresh message may be conveyed in an SIP PUBLISH message.

The SIP PUBLISH message can in fact be used in four different cases, namely: 1) initiating new data, 2) refreshing data (i.e. confirming that earlier initiated data continue to be valid), 3) modifying data, and 4) terminating data no longer valid.

A conventional procedure for maintaining published client data in an application server will now be described with reference to a block diagram shown in FIG. 2. A client terminal A is currently connected to an access network (not shown) in order to communicate with an IMS network 200. As shown in the figure, the IMS network 200 includes a session managing node 202 (e.g. S-CSCF), plural application servers 204 and an HSS 206.

In a first step 2:1, e.g. after being powered-on, terminal A sends a registration request message (i.e. SIP REGISTER) to session manager 202 to become registered as an active terminal in the IMS network 200. Next, terminal A is registered in the HSS 206 according to conventional routines not further described here, as indicated in a step 2:2. In order to maintain the registration in IMS network 200, the terminal is then obliged to refresh the registration by regularly sending "re-register" messages or the like to session manager 202, e.g. every 30-60 minutes, as generally indicated by dashed arrows 2:3.

During this ongoing routine, typically immediately after being registered, terminal A may also send one or more client data publication messages, (e.g. SIP PUBLISH), to one or more service units in the application servers 204, as generally illustrated by a step 2:4. The received client data is then stored in the application server(s) 204, and will remain valid during a time-out period (or TTL), typically set to 30 or 60 minutes.

In order to maintain the published data valid in the application server(s) 204, the terminal must refresh the published data by regularly sending "re-publish" messages as the time-out period expires, generally indicated by plural dashed arrows 2:5, even if the data has not changed. As a result, a terminal may have to send a series of data refreshing messages to different service units in application servers each time their respective validity periods (TTL) expire.

When the terminal 200 is eventually turned off, a "de-register" message is finally sent to the session manager 202, in a step 2:6. Typically, the terminal is also obliged to send a "de-publish" message, not shown, to each concerned service unit in the application server(s) 204 to inactivate published data. Otherwise, the data will only become invalid when the time-out periods expire, as from the last refresh message was sent, resulting in irrelevant active client states after the client has logged off. Time-out periods for data are therefore set relatively short, however resulting in frequent refresh messages.

Basically, the same procedure would be used when the client sends a subscription request for data of other clients, as described above. In that case, the message of step 2:4 would be a subscription request message (e.g. SIP SUBSCRIBE) resulting in the activation of another client state for the subscription in a service unit in an application server 204. Furthermore, the refreshing messages of step 2:5 would be a frequently-sent "re-subscribe" message in order to maintain this client state.

A client may of course have a plurality of different active services involving data publication duties and subscriptions of data, each requiring regular refresh messages from the client terminal in order to be continued. However, there are some obvious load problems associated with having the client's terminal frequently sending re-publish and/or re-subscribe messages to a multitude of service units in application servers, as explained below.

The European Patent Application 05445042.4 discloses a solution for avoiding the sending of frequent refresh messages from a terminal for a service involving published data, when the data has not changed. In this solution, existing routines for maintaining a client registration (i.e. the sending of re-registration messages) is utilised for refreshing also published data.

The present invention addresses the problem of sending numerous publication or subscription messages as well as regular refreshing messages, that must be conveyed to each of a multitude of different services. Concerning reducing the number of refreshing messages, the present invention may be regarded as an alternative or complementary solution with respect to the above-mentioned EP 05445042.4. Thus, if a client has a multitude of various active client states in different service units in application server(s), the burden of sending such service messages can be significant for the terminal, and precious bandwidth in the air interface is also consumed. This situation is illustrated in FIG. 3.

A client terminal A is connected to a mobile access network 300 and has activated a plurality of services in an IMS network, which are illustrated as functional service units 304. For example, service 1 may be IM, service 2 may be PoC, and service 3 may be a Presence service, and so forth, as implemented in one or more application servers as described above. The following example illustrates a conventional procedure for sending refresh messages for the active services, although it is valid for other service messages as well such as initial and remove.

In a first illustrated step 3:1, terminal A sends a first refresh message (e.g. SIP PUBLISH) directed to service 1 at 304:1, which is first received by a serving session manager 302 (e.g. S-CSCF) in the IMS network. Session manager 302 then accordingly routes the refresh message to service 1 in a following step 3:2. Next, terminal A sends another refresh message directed to service 2 at 304:2 to session manager 302 in step 3:3, that is accordingly routed to service 2 in a following step 3:4. A third refresh message is also sent from terminal A to session manager 302 in step 3:5, directed to service 3 at 304:3, that is routed to service 3 in a final illustrated step 3:6.

It should be noted that each step 3:1, 3:3, 3:5 of sending a refresh message over the air interface may involve a plurality of radio messages communicated over the air interface, e.g. for establish a Radio Access Bearer RAB and other control signalling including acknowledging messages in either direction. When several multimedia services are involved, this behaviour thus results in a considerable load on resources in both the terminal and the mobile access network 300, particularly the scarce radio bandwidth.

In the case of subscription for client data, an information delivery server has been proposed for the distribution of information to clients regarding other clients, referred to as a "Resource List Server" RLS in IMS networks. The client information in question may of course include any of the above-described types of presence data or similar.

FIG. 4 illustrates an RLS 400 in a multimedia service network, providing information to a client terminal A on a group of other clients B, C and D. Terminal A is connected to a mobile access network 402 and all messages between terminal A and RLS 400 are routed over a serving session manager 404. It is assumed that clients B, C and D continuously publish data to their application servers 406B, 406C and 406D, respectively, as illustrated by arrows p. Application servers 406B-D may belong to other multimedia service networks or the same network as the RLS 400.

The RLS 400 is connected to a user list server 408 maintaining various user lists such as phone books, contact groups, ad hoc groups or the like. In a first illustrated step 4:1, terminal A sends a request for data on clients B,C,D which are indicated by a reference to a predefined user list, in accordance with a specific service, e.g. the Presence service. According to SIP, this message may then be configured as: SIP SUBSCRIBE (event:Presence,list=1).

In response thereto, RLS 400 retrieves the users and their application servers from user list server 408, according to the received list reference, in a step 4:2. Thereafter, RLS 400 sends a request for data, in a "subscribe" message, to each of the application servers 406B-D for their respective client. This behaviour is sometimes referred to as an "exploder" function for clients. RLS 400 then receives the desired data as notifications from them in response, as generally illustrated by steps 4:3, 4:4 and 4:5, respectively. In a final step 4:6, RLS 400 sends a notification to terminal A, in response to the subscription request 4:1, containing desired data on all clients B-D in the list. This procedure must however be repeated if data is to be collected according to other services, e.g. PoC or IM.

In WO 2005/088949, a solution is described where the amounts of transmitted data and delays can be reduced by a combined push and pull mechanism. In this solution, information does not have to be fetched for every user when information is requested by a client, as this information has already been received and stored continuously by using ongoing network subscriptions, and is therefore immediately available from a user database.

However, it is desirable to avoid the problem of sending numerous service messages for several different services such as publish and subscribe messages as well as regular refreshing messages, in order to relieve both the client's terminal and network resources of this burden, particularly with respect to the air interface.

SUMMARY

The object of the present invention is to address the problems outlined above. In particular, it is an object of the present invention to provide a solution that generally avoids excessive signalling load for client terminals and communication networks when service messages are sent to multiple service units or applications in a multimedia service network.

These objects and others are obtained by providing a method and arrangement according to the attached independent claims.

According to one aspect, the present invention provides a method of distributing service messages coming from a client terminal to multiple service units or applications in one or more application servers in a multimedia service network. A multi-service message comprising a plurality of service message documents is first received from the terminal, where each document contains service-related data targeted to a specific service unit or application. The received multi-service message is then converted into a plurality of individual service messages corresponding to said documents. Finally, each of said individual service messages is sent separately towards its respective target service unit or application. This procedure may be executed by a service message distributor or the like in the multimedia service network.

The received multi-service message may be converted by extracting service-related information and/or data for each specific service message from the respective document, and the individual service messages are then created therefrom. The individual service messages may be sent separately to a session manager or the like in the multimedia service network for further routing to their respective target service units or applications.

An expiry time may further be adjusted for at least one of the separate service messages to fulfil requirements in the corresponding receiving service unit and/or application server.

Converting the received multi-service message into a plurality of individual service messages may include translating the extracted individual documents into a different format. If the documents in the multi-service message have all been encoded in the same format by the terminal, the documents can be translated into a decoded format before sending them towards the target service units or applications.

According to another aspect, the present invention provides an arrangement in a multimedia service network for distributing service messages from a client terminal to multiple service units or applications in one or more application servers in the multimedia service network. The inventive arrangement comprises a receiving unit adapted to receive a multi-service message comprising a plurality of service message documents from the terminal, where each document contains service-related data targeted to a specific service unit or application. Further, a converting unit is adapted to convert the received multi-service message into a plurality of individual service messages corresponding to said documents. The inventive arrangement also comprises a sending unit adapted to send each individual service message separately towards its respective target service unit or application. This arrangement may be implemented in a service message distributor or the like in the multimedia service network.

The converting unit may be further adapted to extract service-related information and/or data for each specific service message from the respective document, and to create said individual service messages therefrom. The converting unit may also be adapted to translate the extracted individual documents into a different format.

The sending unit may be further adapted to send the individual service messages separately to a session manager or the like in the multimedia service network for further routing to their respective target service units or applications.

The inventive arrangement may also comprise means for adjusting an expiry time for at least one of the separate service messages to fulfil requirements in the corresponding receiving service unit and/or application server.

In the inventive method and arrangement, said service messages are typically data publication messages, for initiating, refreshing, modifying or terminating data. However, the service messages may also be requests for information or data on other clients. Typically, the multimedia service network is an IMS network and the service messages are SIP messages such as SIP PUBLISH or SIP SUBSCRIBE.

The multi-service message may be formed such that each individual document is divided into a header part including an event type indicating the corresponding service, and a body part. Each service message document may be embedded in a separate section of the multi-service message. The multi-service message may also include a common header section and a body with said sections for each separate service message document included therein, separated by boundary fields. An expiry time may be given in the common header as valid for those service message documents lacking an individual expiry time in their header parts.

According to yet another aspect, the present invention provides an arrangement in a client terminal for supplying service messages to multiple service units or applications in one or more application servers in a multimedia service network. The inventive client terminal arrangement comprises message creating means adapted to create a multi-service message comprising a plurality of service message documents, each document containing service-related data targeted to a specific service unit or application, and sending means adapted to send the created multi-service message to the multimedia service network.

The inventive client terminal arrangement is preferably adapted to create and send the multi-service message to update plural services simultaneously when the terminal is powered-on.

According to yet another aspect, the present invention provides a method executed in a client terminal for supplying service messages to multiple service units or applications in one or more application servers in a multimedia service network. A multi-service message comprising a plurality of service message documents is then created, where each document contains service-related data targeted to a specific service unit or application, and the created multi-service message is finally sent to the multimedia service network. The multi-service message is preferably created and sent to update plural services simultaneously when the terminal is powered-on.

Further preferred features of the present invention and its benefits can be understood from the detailed description below.

BRIEF DESCRIPTION OF THE DRAWINGS

The present invention will now be described in more detail by means of preferred embodiments and with reference to the accompanying drawings, in which.

DETAILED DESCRIPTION

Briefly described, the present invention can be used to avoid the sending of several separate service messages from a client terminal to multiple service units or applications in a multimedia service network, such as an IMS network. Instead, a plurality of service messages can be conveyed from the terminal as documents or the like in a single combined multi-service message, where each specific service-related document is embedded in a separate section of the multi-service message. In this way, the signalling traffic can be reduced which is generally desirable for both the terminal and the air interface, in particular.

When received in the multimedia service network, the multi-service message is processed by a node or function configured to distribute service messages, herein referred to as "service message distributor", which extracts service-related information and data from each document and sends it in individual service messages separately to the target service unit or application.

The present solution may be used for different types of service messages from a client terminal targeted to service units or applications residing in application servers in the multimedia service network. The service messages may be data publishing messages such as SIP PUBLISH, e.g. for initiating, refreshing, modifying or terminating data. The service messages may also be requests for information or data on other clients such as SIP SUBSCRIBE.

The present solution will now be described in more detail by way of example and with reference to a block diagram shown in FIG. 5, introducing a new multimedia service network node or function: the service message distributor. The message distributor is adapted to convert a received multi-service message into individual service messages targeted to specific service units or applications, by extracting service-related data and creating the individual service messages therefrom in order to send them separately towards the respective target service units or applications.

In the following, reference will be made to regular SIP messages although the present invention is generally not limited thereto. Moreover, the following example will be described with reference to the publish case (i.e. data publication by means of SIP PUBLISH messages), but may also be used for the subscribe case (i.e. request for information or data by means of SIP SUBSCRIBE messages). In a first step 5:1, a client terminal A sends a single combined multi-service message which is received by a session manager 500 (e.g. S-CSCF) in the multimedia service network.

Figure 5:
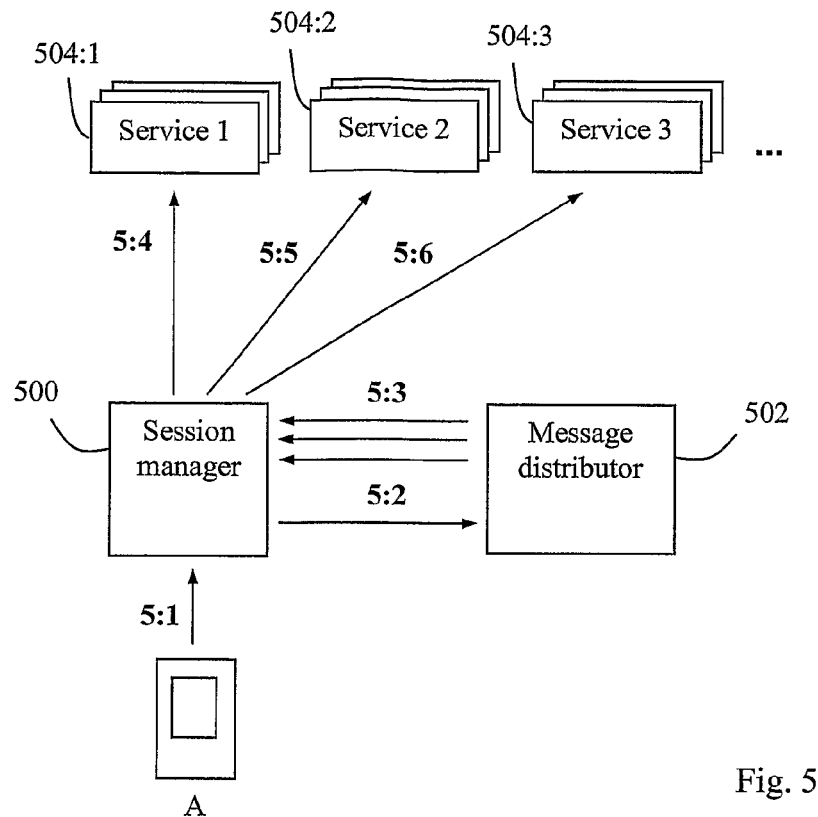
FIG. 5 is a block diagram illustrating a procedure for distributing service messages to plural service units in a multimedia service network, according to one embodiment.
Figure 5A:
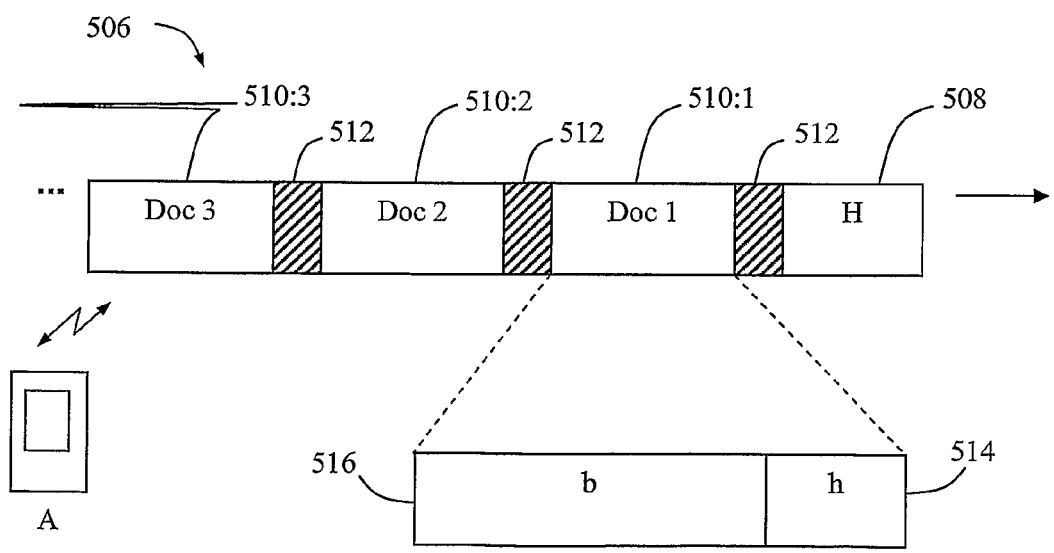
FIG. 5a illustrates schematically an exemplary multi-service message, according to another embodiment.

FIG. 5a illustrates schematically an exemplary multi-service message 506 having a common header section 508 and a body with sections 510:1, 510:2, 510:3 . . . for each separate service message included therein, separated by boundary fields 512. Each service message section 510:1, 510:2, 510:3 . . . in turn includes a document or the like containing service-related data which may be organised in fields that would normally occur if sent separately. Each document 1, 2, 3 . . . may thus comprise a header field 514 and a body 516 with data. In this example, the shown document 1 is directed to a first service, document 2 is directed to a second service, and document 3 is directed to a third service, etc.

Recognising that the message is a multi-service message, e.g. from the given destination address or from a given event type and/or content type which will be described below, the session manager 500 routes the message to a service message distributor 502 in a next step 5:2, for further processing. The message distributor 502 then converts the multi-service message into individual service messages by extracting information and data for each specific service message from the sections 510:1, 510:2, 510:3 . . . and creating new individual service messages therefrom, preferably with required headers and fields according to prevailing standards. Each individual service message is then sent separately to the session manager 500 for further routing, as illustrated by a series of steps 5:3.

Next, the session manager 500 sends each individual service message to a corresponding target service unit or application, e.g. according to a destination address field in each header 514. Hence, the service message according to document 1 is sent to the first service unit 504:1 in a step 5:4, the service message according to document 2 is sent to the second service unit 504:2 in a step 5:5, and the service message according to document 3 is sent to the third service unit 504:3 in a final illustrated step 5:6, and so forth.

Figure 1:
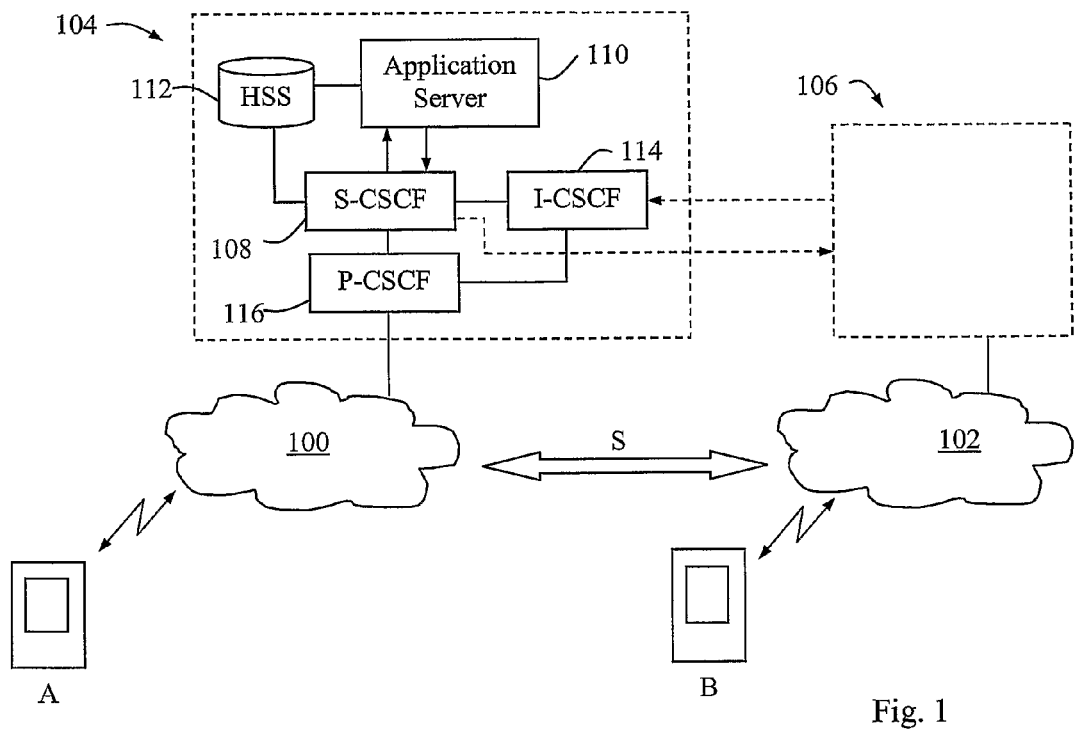
FIG. 1 is a schematic overview of a basic communication scenario in which the present invention can be used.
Figure 2:
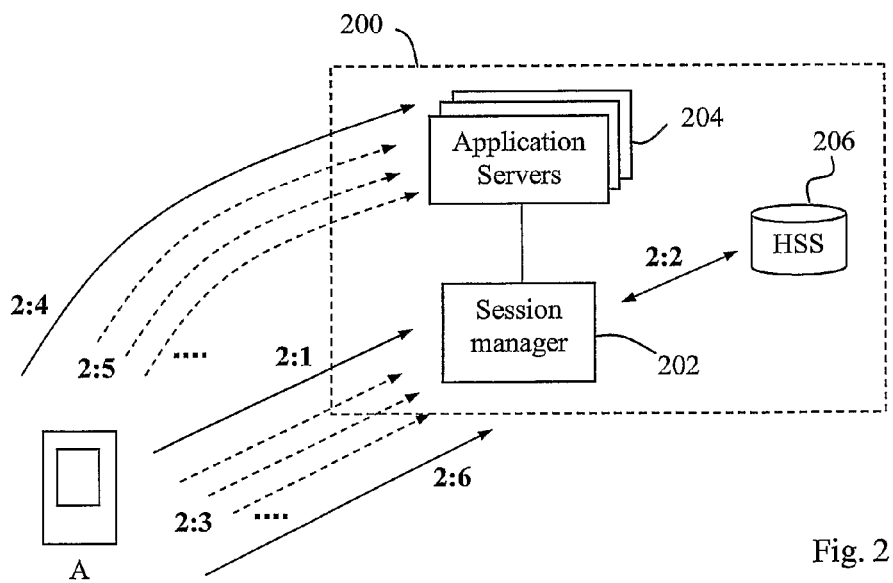
FIG. 2 is a block diagram illustrating a procedure for maintaining client data in application servers, according to the prior art.
Figure 3:
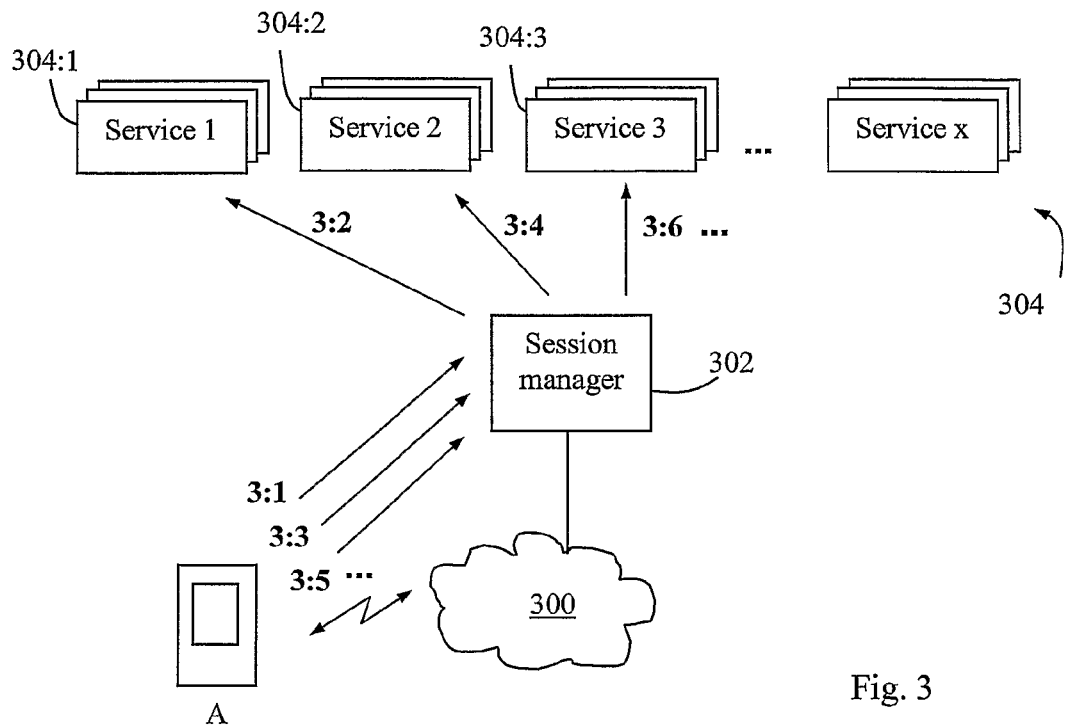
FIG. 3 is a block diagram illustrating a procedure for distributing service messages to plural service units in a multimedia service network, according to the prior art.
Figure 4:
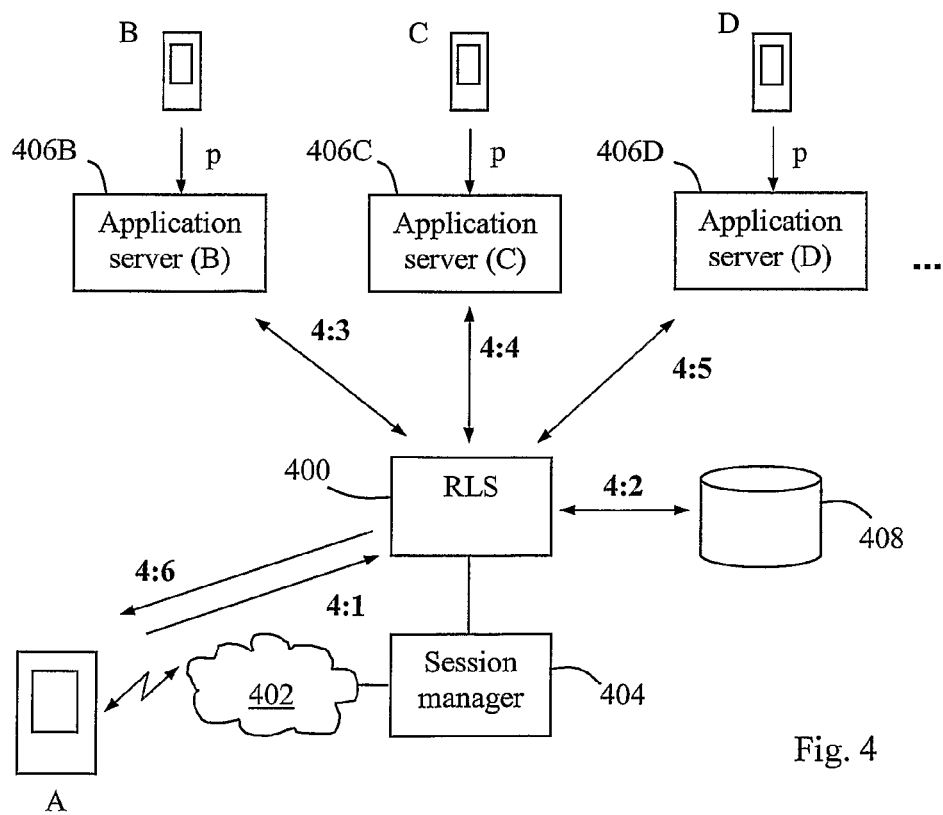
FIG. 4 is a block diagram illustrating a procedure for distributing user-related information from plural application servers to a client, according to the prior art.

By analogy with the above-described function of the RLS 400 of FIG. 4 acting as an "exploder" for clients, the behaviour of the service message distributor 502 can be referred to as an exploder function for services. The message distributor 502 may thus also be called a "Publish Service Exploder" in the case of publish messages, and "Subscribe Service Exploder" in the case of subscribe messages. In the latter case, an RLS node may then be used for collecting data for a selection of plural clients if required in any of the concerned services, as described for FIG. 4, thus basically acting as a client exploder for one service at a time. The service message distributor 502 may be configured as a separate node in the multimedia service network, or integrated as a function in the session manager 500, depending on the implementation.

In the multi-service message 506 illustrated in FIG. 5a, each individual document 1, 2, 3, . . . may be divided into a header part 514 and a body part 516, as mentioned above. Thus, the header part 514 includes an event type indicating the corresponding service, e.g. "event:Presence", "event:IM" or "event:PoC", and optionally a destination address of the targeted service unit or application to which that particular service message is to be sent. An expiry time for the data may also be indicated in the header part 514 which is preferably set to the same value in all documents, i.e. for all services concerned. Thereby, the different services will be "synchronised" such that the terminal can supply any refreshing messages in the same multi-service message each time previous data expire simultaneously.

The common header section 508 is preferably constructed basically according to prevailing standards, e.g. as in a regular SIP PUBLISH message according to the specification RFC3903, although the body with documents 1, 2, 3 . . . is adapted for plural services. The header 508 contains a suitable indication of the fact that a plurality of service messages for different services are included in the multi-service message. This may be indicated by defining a new suitable event type, such as "event:services" or the like, instead of the commonly used service indications "event:presence", "event:PoC", etc. In addition, more or less conventional fields may be included in the common header 508 such as expiry time e.g. "expires=x", destination address e.g. "to:B@x.com", source address e.g. "from:A@y.com", etc. Normally, a field called "contenttype" is also included in the header of any service message, which can be set to "contenttype:multipart/mixed" or similar in the common header 508 in this case, further indicating that this is a multi-service message.

If all services have the same expiry time period, this could be indicated by an expiry time in the common header 508, and the expiry time field can be omitted from the header 514 in each document. However, if different expiry times are set in the documents for the individual services, those would override any expiry time set in the common header 508. For example, an expiry time given in the common header 508 could be valid only for those documents lacking an individual expiry time in their headers 514.

When converting the multi-service message into individual service messages, the message distributor 502 may translate the extracted individual documents 1, 2, 3 . . . into a different format. Preferably, the documents in the multi-service message 506 have all been encoded in the same format by the terminal A in order to save bandwidth over the air interface, in particular. After format translation, message distributor 502 may send the documents in a decoded form towards the target service units or applications 504:1, 2, 3 . . . . Furthermore, the message distributor 502 may be free to adjust the expiry time in the separate service messages to fulfil different requirements in the receiving service units and/or application servers.

Figure 6:
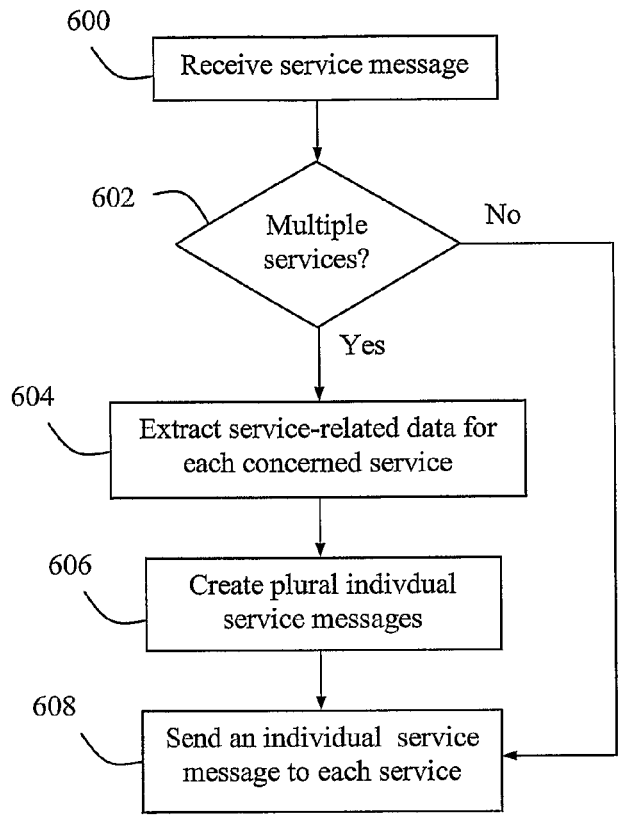
FIG. 6 is a flow chart of a procedure for distributing messages to service units as executed in a multimedia service network, according to another embodiment.

FIG. 6 is a flow chart with steps in a procedure for distributing service messages to service units or applications in a multimedia service network, as executed in the multimedia service network, according to another embodiment. In a first step 600, a service message is generally received from a client's terminal, typically in a session manager such as S-CSCF. In a next step 602, it is determined whether the received service message is a multi-service message, i.e. containing messages directed to multiple services. This may be determined, e.g., by checking the event field in the common header which may be set to "event:services" or similar, to indicate multiple services as explained above.

If the received service message is a multi-service message, embedded service-related data or messages, directed to specific target service units or applications, are extracted from the multi-service message, in a following step 604. The multi-service message may be configured as shown in FIG. 5a. Next, an individual service message is created for each target service in a step 606. Thus, in steps 604 and 606 the received multi-service message is converted into a plurality of individual service messages. Finally, each created individual service message is sent separately in a step 608 towards its respective target service unit or application, as dictated by a destination field in the header of the message.

On the other hand, if it is determined in step 602 that the received service message is a singular message and not a multi-service message, it can be sent immediately to the targeted service unit or application according to conventional procedures. In that case, step 608 can basically be taken directly after step 602.

With further reference back to FIG. 5, it should be noted that steps 600 and 602, as well as step 608, may basically be executed in the session manger 500, whereas steps 604 and 606 may be executed in the service message distributor 502.

Figure 7:
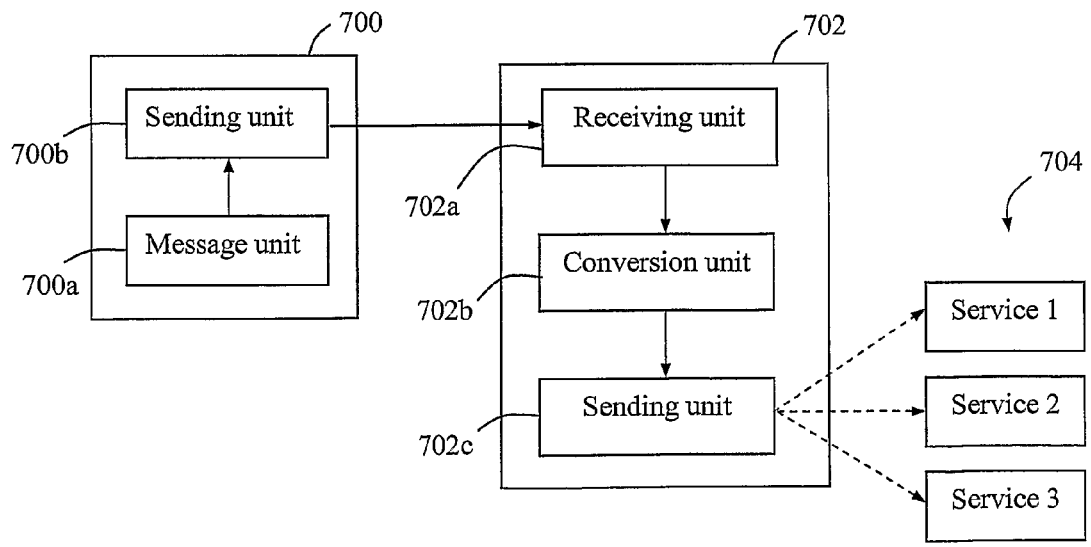
FIG. 7 is a block diagram illustrating a client's terminal and a service message distributor, according to further embodiments.

FIG. 7 is a block diagram schematically illustrating arrangements in a client's terminal 700 and a service message distributor 702, according to further embodiments, which are configured to take part in the inventive procedure, e.g. as described above in connection with FIGS. 5 and 6. It should be noted that FIG. 7 illustrates logically functional elements in the terminal 700 and in the service message distributor 702, respectively, relevant to the present solution. However, the skilled person is free to put them into practice in any suitable manner by means of implementation, not limited to the shown dispositions.

Terminal 700 comprises message creating means, here illustrated as a message unit 700a, adapted to create a multi-service message containing multiple service messages, each being directed to a specific target service unit or application in a multimedia service network. The terminal 700 further comprises sending means, here illustrated as a sending unit 700a, adapted to send the created multi-service message to the multimedia service network.

A typical instance when the terminal is obliged to send multiple service messages to different service units in order to update plural services simultaneously, is when the terminal is being powered-on. In that case, if a multi-service message is sent where the expiry time is set the same for all services, any forthcoming refresh messages can be sent simultaneously in the same multi-service message upon each expiry.

Service message distributor 702 comprises a receiving unit 702a adapted to receive such multi-service messages, e.g. as sent from terminal 700, optionally after being routed by a session manager, e.g. S-CSCF (not shown). Distributor 702 further comprises a conversion unit 702b adapted to convert the multi-service message into a plurality of individual service messages directed to specific target service units or applications, by extracting embedded service messages from the multi-service message and creating a plurality of individual service messages therefrom. Distributor 702 further comprises a sending unit 702c adapted to send the individual service messages separately towards corresponding target service units or applications 704, optionally by first sending them to the session manager which then can route each singular service message to its target service unit or application 704.

By using the present invention for distributing a plurality of individual multimedia service messages, embedded in a single multi-service message, to different targeted service units or applications, the general amount of signalling can be reduced. Thereby, the overall occupation of bandwidth and/or radio resources will be reduced, which is becoming increasingly desirable in wireless communication networks of today. Moreover, the terminal battery consumption due to signalling with the multimedia network can also be kept at a minimum, which is also an ambition in this field.

While the invention has been described with reference to specific exemplary embodiments, the description is generally only intended to illustrate the inventive concept and should not be taken as limiting the scope of the invention, which is defined by the appended claims. For example, the SIP signalling protocol and IMS concept have been used throughout when describing the above embodiments, although any other standards and service networks for enabling multimedia communication may basically be used. Further, the invention is not limited to service messages from mobile terminals but can basically be applied to service messages from any type of multimedia-enabled communication terminal, although saving bandwidth in the air interface is particularly desirable.

The invention claimed is:

1. A method of distributing service messages coming from a client terminal targeted to multiple service units or applications in one or more application servers in a multimedia service network, said service messages including data for services in the multimedia service network, said method comprising the steps of:

receiving a single multi-service message from said client terminal related to a plurality of different services activated for the client terminal in the multimedia network, said multi-service message comprising a plurality of service message documents, each document including service-related data for a corresponding service from said plurality of different services and targeted to a specific service unit or application supporting said corresponding service, wherein the multi-service message includes a common header section, a body with sections for each separate service message document included therein, and an expiry time given in the common header that is valid for those service message documents lacking an individual expiry time;

converting the received multi-service message into a plurality of individual service messages corresponding to said documents; and sending each of said individual service messages separately towards its respective target service unit or application.

2. The method according to claim 1, wherein said method steps are executed by a service message distributor in the multimedia service network.

3. The method according to claim 1, wherein the service messages are data publication messages, for initiating, refreshing, modifying or terminating data.

4. The method according to claim 1, wherein the service messages are requests for information or data on other clients.

5. The method according to claim 1, wherein the received multi-service message is converted by extracting service-related information or data for each specific service message from the respective document, and creating said individual service messages therefrom.

6. The method according to claim 1, wherein the individual service messages are sent separately to a session manager in the multimedia service network for further routing to their respective target service units or applications.

7. The method according to claim 1, wherein each individual document in the multi-service message includes a header part and a body part, the header part including an event type indicating the corresponding service.

8. The method according to claim 1, wherein said sections for the separate service message documents are separated by boundary fields.

9. The method according to claim 1, wherein the expiry time is adjusted for at least one of the separate service messages to fulfill requirements in the corresponding receiving service unit or application server.

10. The method according to claim 1, wherein said converting step includes translating the extracted individual documents into a different format.

11. The method according to claim 10, wherein the documents in the multi-service message have all been encoded in the same format by the terminal, and the documents are translated into a decoded format before being sent towards the target service units or applications.

12. The method according to any of claims 1-11, wherein the multimedia service network is an IMS network and the service messages are SIP messages.

13. A service message distributor node in a multimedia service network for distributing service messages coming from a client terminal targeted to multiple service units or applications in one or more application servers in the multimedia service network, said service messages including data for services in the multimedia service network, said message distributor node comprising:

a receiving unit configured to receive a single multi-service message from said client terminal related to a plurality of different services activated for the client terminal in the multimedia network, said multi-service message comprising a plurality of service message documents, each document including service-related data for a corresponding service from said plurality of different services and targeted to a specific service unit or application supporting said corresponding service, wherein the multi-service message includes a common header section, a body with said sections for each separate service message document included therein, and an expiry time given in the common header that is valid for those service message documents lacking an individual expiry time;

a converting unit configured to convert the received multi-service message into a plurality of individual service messages corresponding to said documents; and a sending unit configured to send each of said individual service messages separately towards its respective target service unit or application.

14. The message distributor node according to claim 13, wherein the service messages are data publication messages, for initiating, refreshing, modifying or terminating data.

15. The message distributor node according to claim 13, wherein the service messages are requests for information or data on other clients.

16. The message distributor node according to claim 13, wherein said converting unit is further configured to extract service-related information or data for each specific service message from the respective document, and to create said individual service messages therefrom.

17. The message distributor node according to claim 13, wherein the sending unit is further configured to send the individual service messages separately to a session manager in the multimedia service network for further routing to their respective target service units or applications.

18. The message distributor node according to claim 13, wherein each individual document in the multi-service message includes a header part and a body part, the header part including an event type indicating the corresponding service.

19. The message distributor node according to claim 13, wherein said sections for the separate service message documents are separated by boundary fields.

20. The message distributor node according to claim 13, wherein the message distributor node is configured to adjust the expiry time for at least one of the separate service messages to fulfill requirements in the corresponding receiving service unit or application server.

21. The message distributor node according to claim 13, wherein said converting unit is configured to translate the extracted individual documents into a different format.

22. The message distributor node according to claim 21, wherein the documents in the received multi-service message have all been encoded in the same format by the terminal, and said converting unit is further configured to translate the documents into a decoded format before being sent towards the target service units or applications.

23. The message distributor node according to claim 13, wherein the multimedia service network is an IMS network and the service messages are SIP messages.

24. A client terminal for supplying service messages to multiple service units or applications in one or more application servers in a multimedia service network, said service messages including data for services in the multimedia service network, said client terminal comprising:

a message creating unit configured to create a single multi-service message related to a plurality of different services activated for the client terminal in the multimedia network, said multi-service message comprising a plurality of service message documents, each document including service-related data for a corresponding service from said plurality of different services and targeted to a specific service unit or application supporting said corresponding service, wherein the multi-service message includes a common header section, a body with sections for each separate service message document included therein, and an expiry time given in the common header that is valid for those service message documents lacking an individual expiry time, wherein each section including one of the separate service message documents includes a destination address for a targeted service unit or application for the service message document included in the section; and a sending unit configured to send the created multi-service message to the multimedia service network.

25. The client terminal according to claim 24, wherein the client terminal is configured to create and send the multi-service message to update plural services simultaneously when the terminal is powered-on.

26. A method executed in a client terminal for supplying service messages to multiple service units or applications in one or more application servers in a multimedia service network, said service messages including data for services in the multimedia service network, said method comprising the steps of:

creating a single multi-service message related to a plurality of different services activated for the client terminal in the multimedia network and comprising a plurality of service message documents, each document including service-related data for a corresponding service from said plurality of different services and targeted to a specific service unit or application supporting said corresponding service, wherein the multi-service message includes a common header section, a body with sections for each separate service message document included therein, and an expiry time given in the common header that is valid for those service message documents lacking an individual expiry time, wherein each section including one of the separate service message documents includes a destination address for a targeted service unit or application for the service message document included in the section; and sending the created multi-service message to the multimedia service network.

27. The method according to claim 26, wherein the multi-service message is created and sent to update plural services simultaneously when the terminal is powered-on.

* * * * *

UNITED STATES PATENT AND TRADEMARK OFFICE
CERTIFICATE OF CORRECTION

PATENT NO. : 8,630,292 B2  
APPLICATION NO. : 12/282558  
DATED : January 14, 2014  
INVENTOR(S) : Danne et al.

Page 1 of 1

It is certified that error appears in the above-identified patent and that said Letters Patent is hereby corrected as shown below:

On the Title Page, in Item (75), under "Inventors", in Column 1, Line 2, delete "Älvsjo" and insert -- Älvsjö --, therefor.

In the Specification

In Column 11, Line 1, delete "sending unit 700a," and insert -- sending unit 700b, --, therefor.

Signed and Sealed this  
Twenty-ninth Day of July, 2014

Michelle K. Lee  
*Deputy Director of the United States Patent and Trademark Office*